US008861341B2

(12) United States Patent
Richardson (10) Patent No.: US 8,861,341 B2
(45) Date of Patent: Oct. 14, 2014

(54) BACKUP NETWORK CONNECTIVITY (75) Inventor: Scott Richardson, Fromelles (FR)

(73) Assignee: Avanti Broadband Limited, London (GB)

( * ) Notice: Subject to any disclaimer, the term of this patent is extended or adjusted under 35 U.S.C. 154(b) by 598 days.

(21) Appl. No.: 12/600,587

(22) PCT Filed: May 9, 2008

(86) PCT No.: PCT/EP2008/055786
§ 371 (c)(1),
(2), (4) Date: Aug. 6, 2010

(87) PCT Pub. No.: WO2008/141961
PCT Pub. Date: Nov. 27, 2008

(65) Prior Publication Data
US 2011/0032865 A1    Feb. 10, 2011

(30) Foreign Application Priority Data

May 18, 2007   (GB) .................................. 0709623.3

(51) Int. Cl.
*H04L 12/26* (2006.01)
*H04L 12/24* (2006.01)
*H04L 12/28* (2006.01)
*H04L 12/703* (2013.01)
*H04L 12/707* (2013.01)
*H04L 12/701* (2013.01)
*H04L 29/12* (2006.01)

(52) U.S. Cl.
CPC ......... *H04L 12/2856* (2013.01); *H04L 61/2514* (2013.01); *H04L 29/12367* (2013.01); *H04L 41/0663* (2013.01); *H04L 45/28* (2013.01); *H04L 45/22* (2013.01); *H04L 45/00* (2013.01); *H04L 43/0811* (2013.01)
USPC .......... 370/228; 370/242; 370/248; 455/12.1; 455/428; 709/239

(58) Field of Classification Search
None
See application file for complete search history.

(56) References Cited

U.S. PATENT DOCUMENTS 6,038,594 A * 3/2000 Puente et al. ................. 709/217
6,748,439 B1 * 6/2004 Monachello et al. ......... 709/229
(Continued)

FOREIGN PATENT DOCUMENTS

GB    2 449 311 B    7/2009
WO    WO 01/88737 A1    11/2001

OTHER PUBLICATIONS

Response to Search Examination Report filed on May 7, 2009, pp. 1-4, and amended pp. 5, 5a, 9, 9a, 10, and 15-19.
(Continued)

*Primary Examiner* — Khoa Huynh
(74) *Attorney, Agent, or Firm* — Wolf, Greenfield & Sacks, P.C.

(57) ABSTRACT

A communications system comprising: a public network service provider; and a satellite hub, wherein the public network service provider is connectable to a client system by a first link and connectable to a public network by a second link, and wherein the satellite hub is connectable to the client system via a satellite link, wherein the public network service provider and the satellite hub are connected by means of a dedicated point-to-point interconnect.

27 Claims, 6 Drawing Sheets

(56) References Cited

U.S. PATENT DOCUMENTS

| | | |
|---|---|---|
| 6,779,039 B1 | 8/2004 | Bommareddy et al. |
| 2003/0204617 A1 | 10/2003 | Buchsbaum et al. |
| 2004/0443759 | 3/2004 | McGovern et al. |
| 2005/0008017 A1 | 1/2005 | Datta et al. |
| 2005/0089015 A1* | 4/2005 | Tsuge et al. .................. 370/351 |
| 2006/0146696 A1 | 7/2006 | Li et al. |
| 2007/0011268 A1* | 1/2007 | Banga et al. .................. 709/217 |
| 2007/0038767 A1* | 2/2007 | Miles et al. .................. 709/230 |
| 2008/0219268 A1* | 9/2008 | Dennison .................. 370/395.2 |

OTHER PUBLICATIONS

British Search Report dated Aug. 31, 2007, from corresponding International Application No. PCT/EP2008/055786.

International Search Report dated Sep. 15, 2008, from corresponding International Application No. PCT/EP2008/055786.

* cited by examiner

BACKUP NETWORK CONNECTIVITY

FIELD OF THE INVENTION

The present invention relates to the provision of a backup network connection which can be used to maintain connectivity to a public network when a primary link fails. In particular, embodiments relate to the provision of a satellite backup system.

BACKGROUND OF THE INVENTION

In a world where access to the internet is critical, the sudden and unplanned loss of that access is at minimum disruptive and costly, and at worst catastrophic.

Access to the internet is usually, although not necessarily, made by means of terrestrial connections. The obvious solution to avoid the possibility of loss of access to the internet would be to install a secondary terrestrial connection to the internet which may be used if a primary terrestrial connection to the internet is lost.

Figure 1:
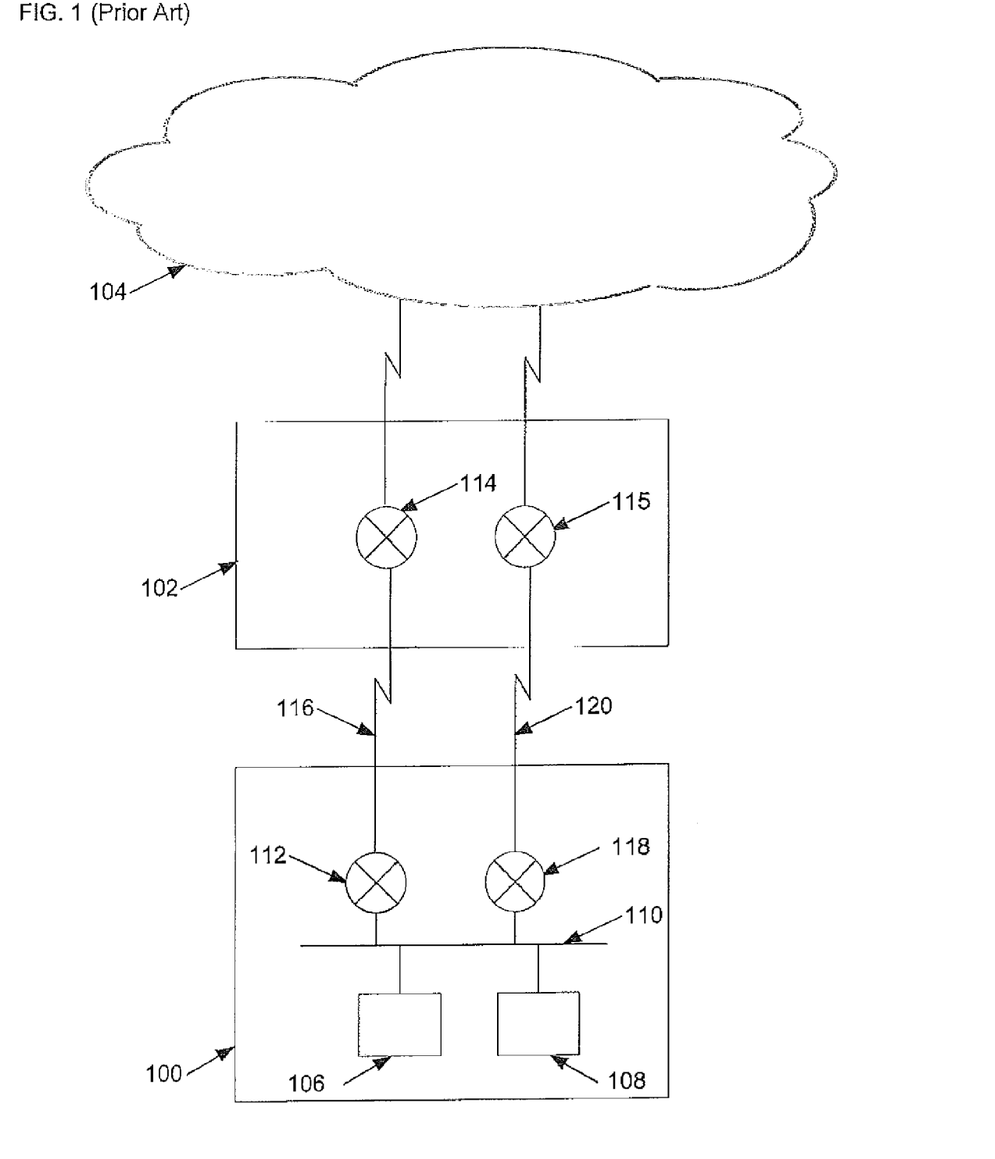
FIG. 1 is a schematic diagram showing a client system connected to the internet via two terrestrial connections to an internet service provider.

Such an arrangement is illustrated schematically in FIG. 1. In this arrangement a client system 100 is connected to an internet service provider 102 which is connected to the internet 104. The internet service provider 102 routes communications between the client system 100 and the internet 104. The client system may, for example, comprise servers 106, 108 connected to a common bus 110. A primary router 112 can route communications between the servers 106, 108 and a primary upstream router 114 in the internet service provider via a primary connection 116. In the event that the primary router 112 and/or the primary connection 116 and/or the primary upstream router 114 fails, communications are routed via a secondary router 118 and a secondary connection 120 to a failover upstream router 115 in the internet service provider 102 which then forwards the communications into the internet.

One problem with this arrangement is that terrestrial connections are likely to be laid in a common conduit, and thus any disruption to the primary connection is also likely to affect the secondary connection. As such, it would be advantageous to provide a secondary connection which is physically diverse from the primary system in order to reduce the possibility that both systems will be lost at the same time, for example, due to a common disruption.

One known way of providing physically diverse primary and secondary connections is to utilize a terrestrial primary connection and a satellite backup system as the secondary connection to the internet. As the terrestrial and satellite connections are physically diverse, there is less likelihood that both the connections will be disrupted at the same time.

Figure 2:
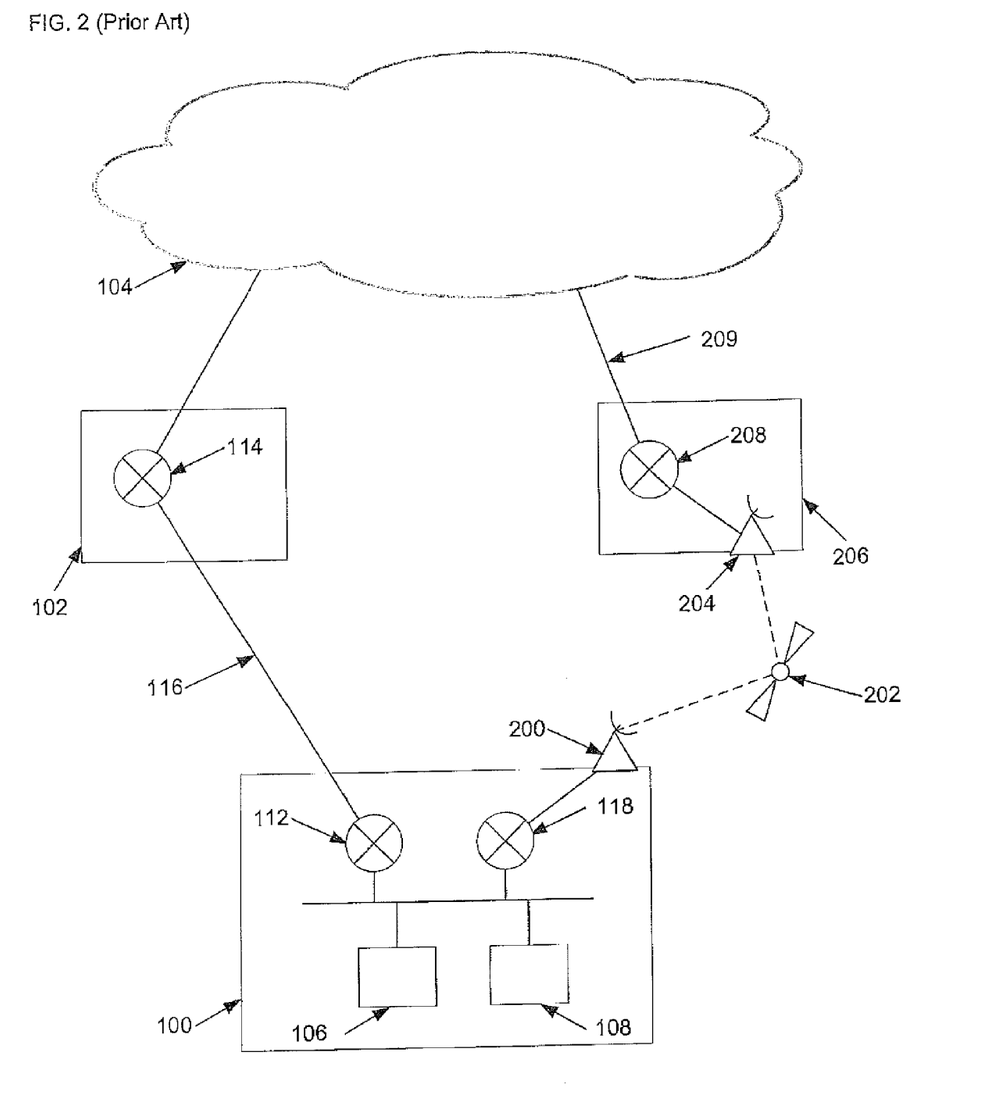
FIG. 2 is a schematic diagram showing a client system connected to the internet via a terrestrial connection to an internet service provider and a satellite backup link to a satellite hub.

Such an arrangement is illustrated schematically in FIG. 2. To show how this arrangement relates to the arrangement illustrated in FIG. 1, like component have been given like reference numbers. As is evident, the primary connection to the internet is substantially the same as that illustrated in FIG. 1. However, the secondary backup connection is implemented by way of a satellite connection. In the event that the primary router 112 and/or the primary upstream router 114 and/or the primary connection 116 fails, communications from the client system 100 are routed via the secondary router 118 to a satellite transceiver 200. The communications are then transmitted via a satellite 202 to a transceiver 204 of a satellite hub 206. The communications can subsequently be forwarded into the internet 104 by a router 208 in the satellite hub over link 209.

A problem with the arrangement illustrated in FIG. 2 is that while internet access may be assured, full internet presence/visibility is not provided. Full internet presence/visibility is desirable to ensure that incoming communications from other internet users are successfully transmitted to the client system. That is, the satellite backup system is not fully transparent to other internet users because it is in a different administrative domain and uses different routing protocols. If the primary route fails, communications from the client system to the internet can readily be re-routed via the backup satellite route. Furthermore, Internet users receiving communications via the backup satellite route may reply via the backup satellite route as the necessary routing information can be provided in the communications sent out from the client system via the satellite route. However, other internet users, which have not received a communication from the client system via the backup satellite route, will not be aware that the primary route has failed and will continue to try and send communications to the client system via the primary route.

Similar problems to those discussed above for connectivity to the internet also exist for connections within an organisation's own private network. In this regard, prior art solutions provide a backup satellite connection for communication between two points in an organisation's own private network rather than providing a backup satellite connection to the internet.

Figure 3:
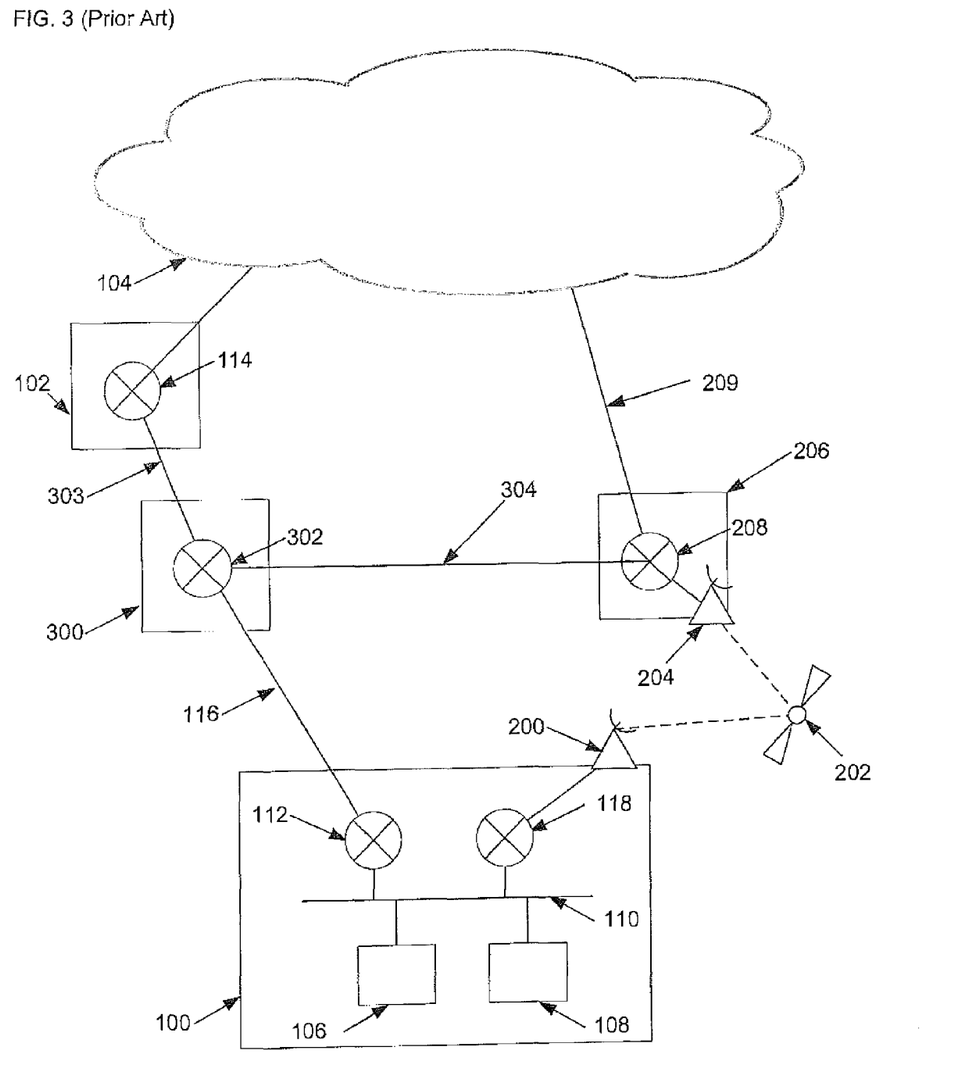
FIG. 3 is a schematic diagram showing an arrangement comprising a satellite backup system connecting two points within an organisation's private network.

Such an arrangement is illustrated schematically in FIG. 3. To show how this arrangement relates to the arrangements illustrated in FIGS. 1 and 2, like components have been given like reference numbers. In this arrangement the client system 100 is connected to the headquarters 300 of their organisation via primary connection 116 in the organisation's private network. The headquarters 300 is connected to an internet service provider 102 which is connected to the internet 104. The internet service provider 102 routes communications between the headquarters 300 and the internet 104.

The client system may be structured in a similar manner as described in relation to FIG. 2. A primary router 112 can route communications between the servers 106, 108 and a router 302 at headquarters via the primary connection 116. In the event that the primary router 112 and/or the primary connection 116 fail, communications from the client system 100 are routed via the secondary router 118 to a satellite transceiver 200. The communications are then transmitted via a satellite 202 to a transceiver 204 of a satellite hub 206. The communications can subsequently be forwarded to the headquarters by the router 208 in the satellite hub via a connection 304 made between the satellite hub and the headquarters. Similarly, communications from the headquarters can be sent to the client system in the reverse direction via the connection 304 and the satellite system in the event that the primary router 112 and/or the primary connection 116 fail. Routing between the client system 100, the satellite hub 206 and the headquarters 300 is static in nature as the satellite backup connection in this arrangement is only required to provide an alternative route between two fixed points within the organisations private network: the client system 100; and the headquarters 300.

The organisations primary connection to the internet is through headquarters 300 and the internet service provider 102 via connection 303. In the event that connection 303 fails, it may still be possible to re-route signals to the internet via the satellite hub 206 over link 209. However, the arrangement suffers the same problems as outlined above in relation to FIG. 2. Namely, while internet access may be assured, full internet presence/visibility is not provided. That is, the satellite backup system is not fully transparent to other internet users. If the primary route fails, communications from the client system to the internet could be re-routed via the backup satellite route. Furthermore, internet users receiving communications via the backup satellite route may reply via the backup satellite route as the necessary routing information (e.g. as conveyed by network address translation (NAT)) can be provided in the communications sent out from the client system via the satellite route. However, other internet users, which have not received a communication from the client system via the backup satellite route, will not be aware that the primary route has failed and will continue to try and send communications to the client system via the primary route. In addition, providing a satellite backup system within an organisation's private network can be too expensive, especially for SMEs (small and medium sized enterprises) or SOHOs (Small Offices, Home Offices). Further still, backup systems can be difficult to implement in organisations with many sites such as retail chains.

Another known solution to providing backup connectivity requires the use of multiple internet service providers for re-routing communications. However, this solution requires multiple relationships with internet service providers which can be difficult to implement and manage. Furthermore, it may not always be possible to find a second service provider. Additionally, the use of multiple service providers can be expensive and may not offer true physical diversity.

SUMMARY OF THE INVENTION

The present inventors have recognized that while several solutions may exist whereby access from a client system to the internet can be maintained, there is a need to maintain access from the rest of the world across the internet to the client system. Inbound routing to, for example, SMEs and organisations with many sites like retail chains, is difficult using known architectures and procedures.

Embodiments of the present invention aim to solve one or more of the aforementioned problems. In particular, certain embodiments aim to provide a backup satellite connection which not only assures internet access but also assures full internet presence/visibility. Thus, certain embodiments aim to provide an internet continuity product that resolves the problem of preserving full two-way transparent connectivity to the internet in the event of a primary connectivity failure. Furthermore, certain embodiments aim to provide an internet continuity product which is affordable for SMEs. Further still, certain embodiments aim to provide an internet continuity product which allows inbound routing to organisation with many sites like retail chains.

According to a first aspect of the present invention there is provided a communications system comprising: a public network service provider; and a satellite hub, wherein the public network service provider is connectable to a client system by a first link and connectable to a public network by a second link, and wherein the satellite hub is connectable to the client system via a satellite, wherein the public network service provider and the satellite hub are connected by means of a dedicated point-to-point interconnect.

By public network we mean a network which is available for public access such as the internet as opposed to, for example, a private corporate network.

By public network service provider we mean a network service provider which provides the public with services from a public network as opposed to, for example, a service provider within a private corporate network.

The dedicated point-to-point interconnect may be a virtual interconnect between the public network service provider and the satellite hub over the public network. Alternatively, the dedicated point-to-point interconnect may be a physical interconnect between the public network service provider and the satellite hub. For example, the dedicated point-to-point interconnect can be provided in one of the following ways: tunnelled over the public network; VPN (Virtual Private Network) tunneling over the public network; controlled routing over the public network; physical cross connect, for example, in a common internet exchange or carrier neutral co-location; or via a leased line. The interconnect provides a dedicated point-to-point connection between the public network service provider and the satellite hub.

Providing a dedicated point-to-point interconnect between the public network service provider and the satellite hub allows outbound and inbound communications from the public network to be re-routed to the satellite hub in the event that the first link between the public network service provider and the client system fails. The architecture allows for full internet presence/visibility, which ensures that incoming communications from other internet users are successfully transmitted to the client system.

If the first (primary) route fails, communications from the client system to the public network can be re-routed via the backup satellite route. These outgoing communications may be routed via the interconnect and the public network service provider. Alternatively, a separate connection between the satellite hub and the public network may be provided. Furthermore, internet users receiving communications via the backup satellite route may reply via the backup satellite route as the necessary routing information (e.g. as conveyed by NAT) can be provided in the communications sent out from the client system via the satellite route. In this respect, the present invention can function in the same manner as the previously described prior art arrangements. However, the present invention differs from the prior art arrangements in the following way.

As described in relation to the prior art arrangements, other internet users, which have not received a communication from the client system via the backup satellite route, will not be aware that the primary route has failed and will continue to try and send communications to the client system via the primary route. In accordance with embodiments of the present invention, these communications can be re-routed, by the public internet service provider, through the interconnect to the satellite hub where they can then be transmitted via satellite to the client system. Accordingly, even communications from other internet users will be successfully delivered to the client system when the first/primary connection fails. As such, the present invention allows full two-way connectivity to the internet in the event of a primary connectivity failure.

Furthermore, the communication system of the present invention can be implemented by the public internet service provider and the provider of the satellite hub in collaboration. As such, primary and a secondary links to the internet having full two-way connectivity can be provided to a client as a service without the client being required to make whole-sale modifications to their own private network by, for example, incorporating a satellite backup connection therein. Accordingly, the communication system of the present invention provides a viable solution for SMEs.

Further still, the public network service provider can readily be connected to a plurality of client systems and the satellite hub can be readily adapted to communicate with these client systems. Accordingly, the communication system can readily provide full two-way connectivity for a plurality of client systems such as, for example, in organisations with many sites like retail chains.

A single dedicated point-to-point interconnect between the public network service provider and the satellite hub can thus provide a backup link for a plurality of organizations. This contrast with the arrangement shown, for example, in FIG. 3 in which each organization would require their own interconnect between their respective headquarters and a satellite hub. An additional advantage of the present invention over an arrangement such as that shown in FIG. 3 is that the interconnect between an organizations headquarters and a satellite hub is likely to be long and expensive. In contrast, a public network service provider and a satellite hub are likely to be more closely located, for example in a common public network exchange point, and thus can be more easily and cheaply connected together via a dedicated point-to-point interconnect.

The public network may comprise a plurality of routers supporting a public dynamic routing protocol, e.g. the Internet. The public network service provider and the satellite hub can be adapted to utilize a common routing protocol in a private network for routing communications via the interconnect. The same protocol may also be used for routing communications between the public network service provider and the client system via the first (primary) link. The same protocol may also be used for routing communications between the satellite hub and the client system via the satellite link.

The public network service provider can be adapted to translate between the public dynamic routing protocol and the private routing protocol for routing communications between the public network and the client system. The satellite hub may also be connected to the public network. The satellite hub can be adapted to translate between the public dynamic routing protocol and the private routing protocol for routing communications between the public network and the client system The use of a private routing protocol in links to the client system is advantageous in that it is much cheaper and easier to implement. Acquisition of the various permissions and identifiers required for supporting a public dynamic routing protocol can be expensive and difficult, and often impossible for SMEs and SOHOs.

The private routing protocol may be dynamic or static in nature. Dynamic routing may be implemented using an interior gateway protocol (IGP) such as routing interchange protocol (RIP). While static routing has the advantage of being easy to implement when there are a small number of routers using the private routing protocol, this method may not work well if the routing information has to be changed frequently or needs to be configured on a large number of routers. In this case it would be advantageous to use a dynamic routing protocol such that when new clients are incorporated into the arrangement routing information will automatically be updated in the various components. The use of a private dynamic routing protocol is still more simple to implement than using a global dynamic routing protocol as the routing tables will be smaller and less routers will share the tables.

According to a second aspect of the present invention there is provided a public network service provider for use in the communications system of the first aspect. The public network service provider is connectable to a client system by a first link and connectable to a public network by a second link, and is adapted to connect to a satellite hub by means of a dedicated point-to-point interconnect.

According to a third aspect of the present invention there is provided a satellite hub for use in the communications system of the first aspect. The satellite hub is connectable to a client system via a satellite, and is adapted to connect to a public network service provider by means of a dedicated point-to-point interconnect.

According to a fourth aspect of the present invention there is provided a communications network comprising: a client system comprising a satellite transceiver; a public network service provider supporting a public dynamic routing protocol; a public network comprising a plurality of routers supporting the public dynamic routing protocol; a satellite hub comprising a satellite transceiver; and a satellite, wherein the client system is connected to the public network service provider by a first link, the public network service provider is connected to the public network by a second link, and the satellite hub and the client system are connected via the satellite and the satellite transceivers, wherein the public network service provider and the satellite hub are connected by means of a dedicated point-to-point interconnect. The public network service provider and the satellite hub may be adapted to utilize a common private routing protocol for routing communications via the interconnect. The client system may also be adapted to support a standby router protocol such as HSRP (Hot Standby Router Protocol) or VRRP (Virtual Router Redundancy Protocol). The public network service provider may be adapted to translate between the public dynamic routing protocol and the private routing protocol. The satellite hub may also be connected to the public network and may be adapted to translate between the public dynamic routing protocol and the private routing protocol.

According to a fifth aspect of the present invention there is provided a method for providing connectivity between a client system and a public network by providing one or more of the first to fourth aspects of the present invention discussed above. In particular, there is provided a method for providing connectivity between a client system and a public network, the method comprising: providing a public network service provider and a satellite hub with a dedicated point-to-point interconnect therebetween, routing communications from the public network to the client device via a first link in normal operation, and re-routing communications from the public network via the dedicated point-to-point interconnect when the first link fails.

BRIEF DESCRIPTION OF THE DRAWINGS

For a better understanding of the present invention and to show how the same may be carried into effect, embodiments of the present invention will now be described by way of example only with reference to the accompanying drawings, in which.

DETAILED DESCRIPTION OF EMBODIMENTS OF THE INVENTION

Figure 4:
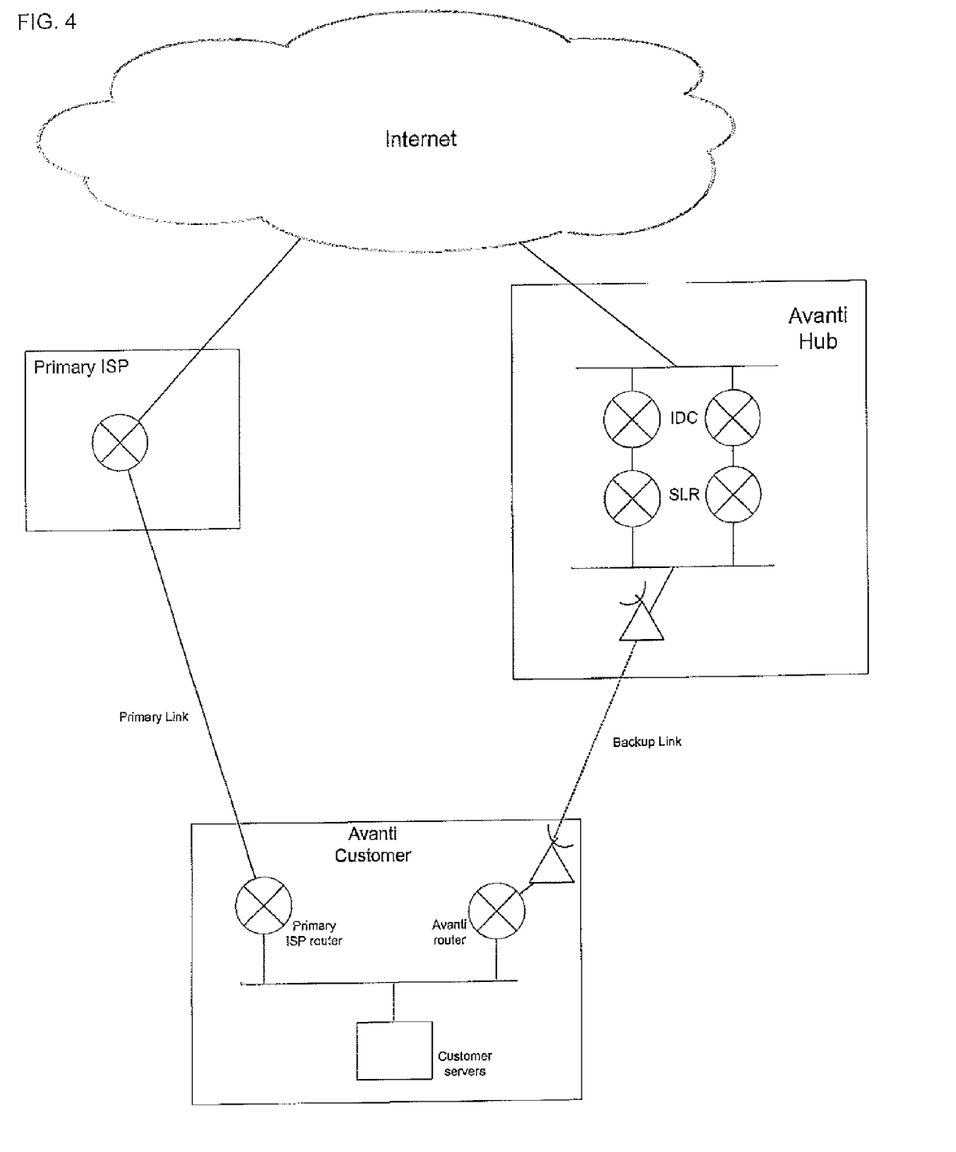
FIG. 4 is a schematic diagram showing the applicant's previous infrastructure for providing a satellite backup link to the internet.

The applicant (Avanti) has previously used a satellite infrastructure of the type illustrated in FIG. 4. The infrastructure comprises satellite equipment itself (transceivers, antennas), and network equipment providing connectivity on layer 3 (satellite link routers—SLRs). The SLRs are connected to internet data centres (IDCs) managed by the applicant.

In order to provide a satellite backup connection for a customer, the applicant installs a backup/secondary router in the customer's system and a satellite transceiver to which this router is connected. The backup router is adapted to detect if the customer's primary router, the upstream internet service provider router, or primary link therebetween, has failed and route communications to the satellite transceiver which transmits the communications via satellite to a satellite hub managed by the applicant. Communications can then be forwarded into the internet via the SLRs and IDCs.

The arrangement is similar to that illustrated in FIG. 2. As previously described in the summary of invention section, a problem with such an arrangement is that, while it works well for communications from the customer to the internet, it does not provide full presence/visibility for the client's satellite backup system in the internet.

Figure 5:
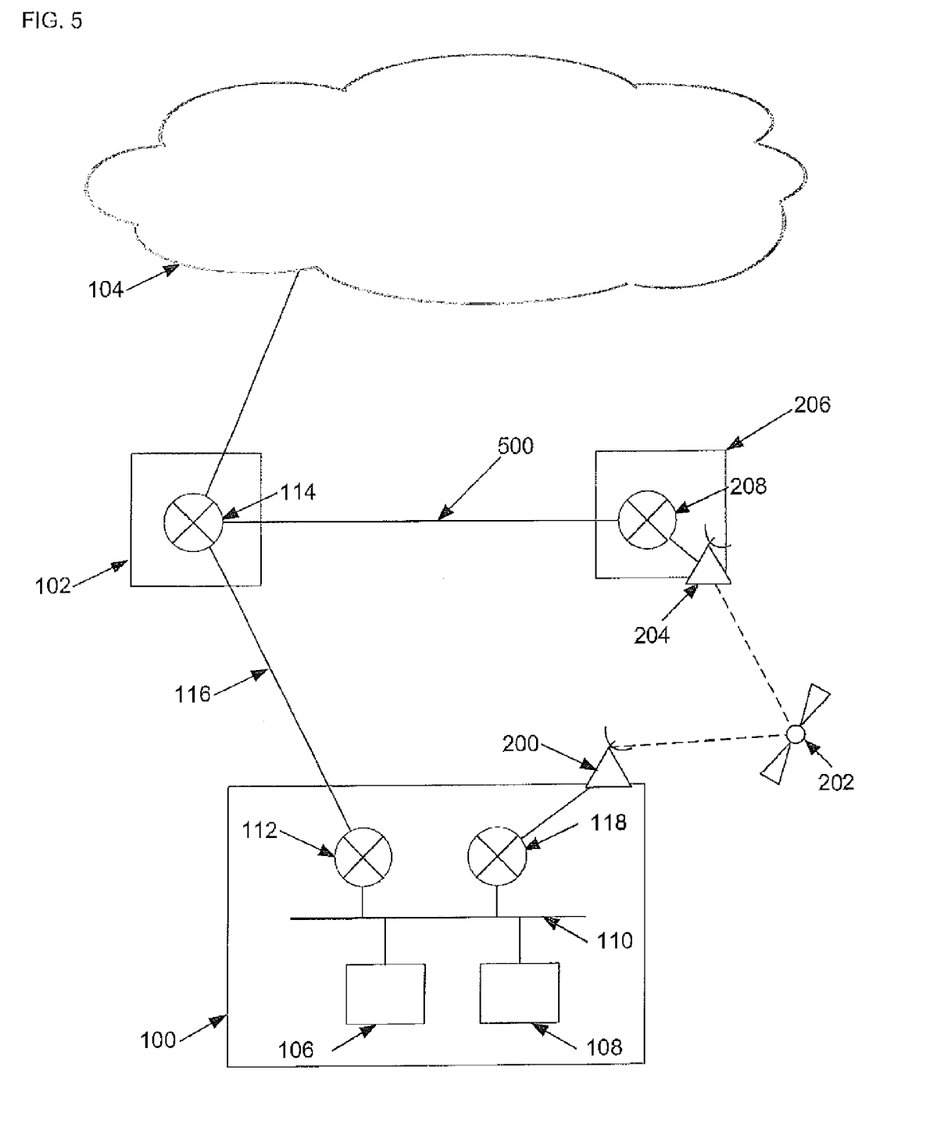
FIG. 5 is a schematic diagram showing an embodiment of the present invention.

An embodiment of the present invention is illustrated in FIG. 5. To show how this arrangement relates to the arrangements illustrated in FIG. 2, like components have been given like reference numbers.

As can readily be seen by comparison of FIG. 2 and FIG. 5, the main difference between these arrangements is the provision of a dedicated point-to-point interconnect 500 between the public internet service provider 102 and the satellite hub 206. In normal operation, communications between the public network 104 and the client device 100 are routed by the public internet service provider 102 using the first link 116. However, if the first link 116 or the router 112 fail, communications from the public network are re-routed by the public internet service provider via the dedicated point-to-point interconnect to the satellite hub 206 which then forwards the communications to the client system 100 via the satellite 202.

While in FIG. 5, the public network service provide 102 is shown as having a single router 114, it will be understood that it may have a plurality of routers which may be interconnected. The first link 116 and the dedicated point-to-point interconnect 500 may be connected to different routers in the public network service provider 102 such that if one router fails, the other router may still be utilized.

Figure 6:
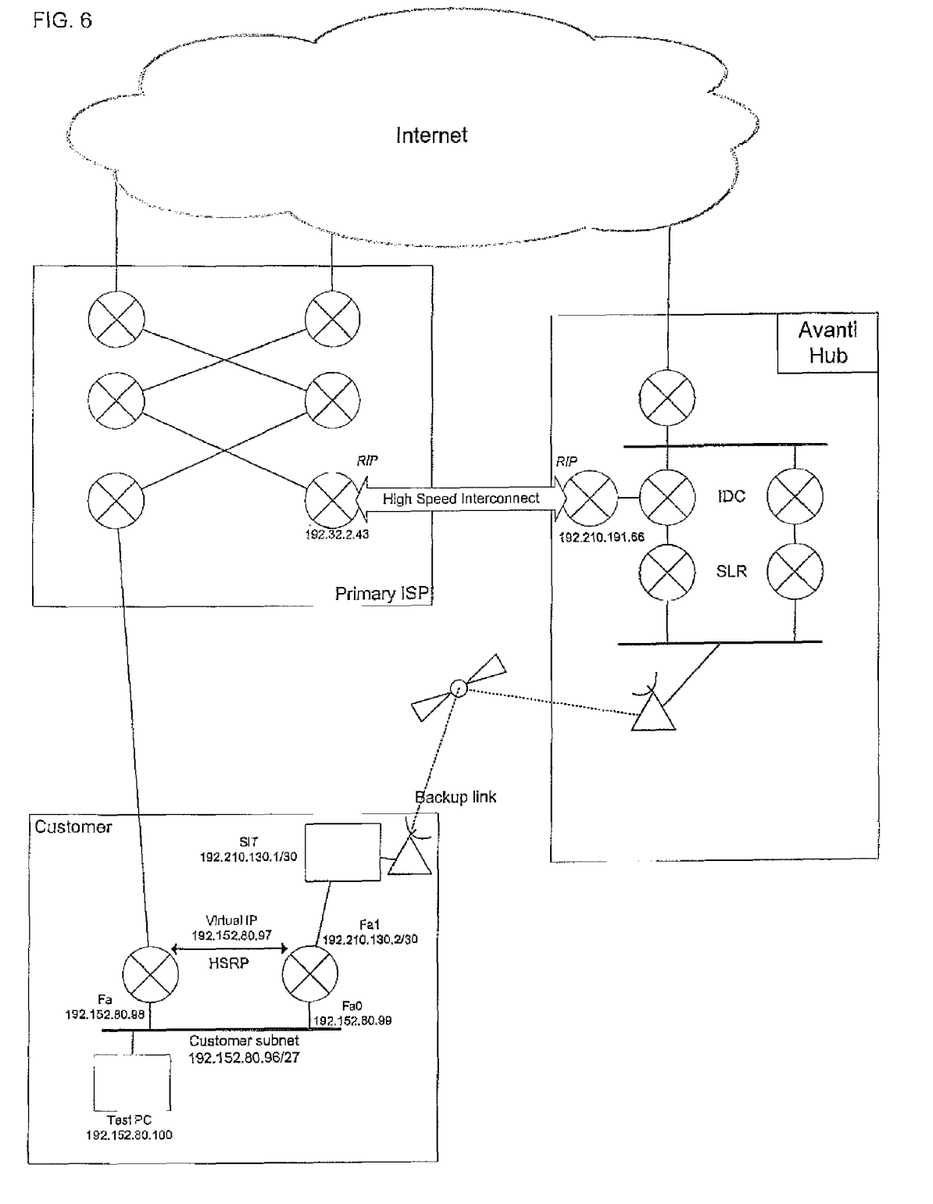
FIG. 6 is a schematic diagram showing a more detailed embodiment of the present invention.

A more detailed implementation of the present invention is illustrated in FIG. 6. It can be seen that this implementation is based on a modification of the architecture illustrated in FIG. 4. The difference between the arrangements illustrated in FIGS. 4 and 6 lies in the choice of routing protocols and the provision of a means of tunneling between the primary ISP and the satellite hub in order to provide a high speed dedicated point-to-point interconnect therebetween. In order to arrive at the arrangement illustrated in FIG. 6, from that illustrated, for example, in FIG. 4, the following modifications may be made.

A router in the primary ISP is modified, or an additional router is provided, to use a suitable private routing protocol such as an interior gateway protocol like RIP. A modified/additional router supporting the private routing protocol is also provided in the satellite hub. A dedicated point-to-point interconnect is made between the two routers in order to provide a high speed interconnect therebetween. This may be done using a virtual interconnect or by providing a physical interconnect.

The interior gateway protocol used may be agreed upon between the Primary ISP and the satellite hub provider. This may be a distance-vector such as RIP or IGRP (interior gateway routing protocol), or a link-state such as OSPF (open shortest path first) or IS-IS (intermediate system to intermediate system). Coupled with policy-based routing, the interior gateway protocol can detect failure of the customer's primary router, the link between the customer and the primary ISP (e.g. via a wireless area network—WAN), or an upstream router, and then route ingress traffic over the high speed dedicated point-to-point interconnect between the ISP network and the satellite hub provider's network.

Static routing can be employed in the satellite network side, on the assumption that any ingress traffic arriving via the high speed dedicated point-to-point interconnect will always be routed via the satellite link.

Egress traffic may be protected from link failure between the customer and the public Internet service provider (e.g. terrestrial WAN failure) in the following manner.

To provide default gateway redundancy to the customer's server farm, either HSRP (Hot Standby Router Protocol) or VRRP (Virtual Router Redundancy Protocol-RFC2338, standard-based) may be used on the pair of customer routers. Using these protocols, one of the routers (primary) will respond to a virtual IP address which may be configured as the default gateway address on the servers. In the case of primary router failure, the secondary router will detect this failure and start to respond to the virtual address. In the present case, the router with the link to the Primary ISP may be configured as the primary router and the router with the link to the satellite hub provider may be configured as the secondary router. Switchover time for HSRP with default timers is 10 seconds. Switchover time for VRRP with default timers is 4 seconds. To take into account slow routing protocol convergence, "pre-empt timeout" may be configured to allow enough time for the routing protocol to converge. Without this command, HSRP/VRRP may switchover faster than routing protocol can recalculate its routing table. Then the customer equipment will have already forwarded traffic to the correct router, but the routing protocol on this router will still not be ready to route this traffic correctly. This will result in a so called "black hole". As such, a "pre-empt timeout" may be used to make HSRP/VRRP wait for the routing protocol to converge.

The dedicated point-to-point interconnect between the Primary ISP and the satellite hub, over which customer traffic is routed when terrestrial failure occurs, can be built in various ways depending on cost and quality of service requirements. These include: tunneling over the Internet—lowest cost, no quality of service (QoS) guarantees, traffic in the clear; VPN (Virtual Private Network) tunnel over the Internet—low cost, no QoS guarantees, traffic encrypted; controlled routing over the Internet—low cost, some QoS guarantees; physical cross connect in common internet exchange or carrier neutral co-lo (co-location)—higher cost, QoS guarantee, secure route; or leased line—most expensive.

Embodiments of the present invention offer the following advantageous features: one stop solution with quality of service (via ISP sales channel); truly physical diversity (satellite and not terrestrial); ubiquitous (satellite coverage); low cost; and fully transparent using standard protocols.

While this invention has been particularly shown and described with reference to preferred embodiments, it will be understood to those skilled in the art that various changes in form and detail may be made without departing from the scope of the invention as defined by the appended claims.

The invention claimed is:

1. A communications system comprising:
a public internet service provider; and
a satellite hub,
wherein the public internet service provider is connectable to a client system by a first link and connectable to an internet by a second link,
wherein the satellite hub is connectable to the client system via a satellite link,
wherein the public internet service provider and the satellite hub are connected by a dedicated point-to-point interconnect, and
wherein the public internet service provider is configured to detect failure of the first link between the public internet service provider and the client system and re-route outbound and inbound communications to and from the internet to the satellite hub via the interconnect between the public internet service provider and the satellite hub in the event that the first link between the internet service provider and the client system fails, thereby providing a back-up route to the client system; and
wherein the internet service provider is arranged to receive new communications for the client system from internet users in said internet who have not received a communication from the client system via the back-up route and who do not have visibility of the back-up route and reroute the new communications via the dedicated point-to-point interconnect, such that the back-up route is transparent to said internet users in event of said failure.

2. A communications system according to claim 1, wherein the interconnect is one of: a virtual interconnect between the public internet service provider and the satellite hub over internet; and a physical interconnect between the public internet service provider and the satellite hub.

3. A communications system according to claim 1, wherein the interconnect is provided by one of: tunnelling over internet; vpn (virtual private network) tunnelling over internet; controlled routing over internet; a physical cross connect; a common internet exchange; a carrier neutral co-location; and a leased line.

4. A communications system according to claim 1, wherein the internet service provider and the satellite hub are adapted to utilize a common private routing protocol for routing communications via the interconnect.

5. A communications system according to claim 4, wherein the internet service provider is adapted to translate between a public dynamic routing protocol used by routers in the internet and the common private routing protocol.

6. A communications system according to claim 4, wherein the common private routing protocol is one of dynamic and static.

7. A communications system according to claim 4, wherein the common private routing protocol is an interior gateway protocol (igp).

8. A communications system according to claim 1, wherein the satellite hub is adapted to be further connectable to internet.

9. The communications system of claim 1, wherein the internet service provider provides internet access to a plurality of organizations and said client system is a client system of one of said organizations, the internet service provider being outside of any of the organizations' own networks, and the first link providing a connection between said one of the organizations and the public internet service provider outside the organizations.

10. The communication system of claim 9, wherein each of said organizations comprises a respective headquarters and the internet service provider is outside of said headquarters.

11. The communications system of claim 9, wherein the internet service provider provides said back-up route without incorporating a satellite backup connection within any of said organizations' own networks.

12. A public internet service provider comprising:
a first link for connecting the public internet service provider to a client system;
a second link for connecting the public internet service provider to an internet; and
a dedicated point-to-point interconnect for connecting the public internet service provider to a satellite hub, and
wherein the public internet service provider is configured to detect failure of the first link between the public internet service provider and the client system and re-route outbound and inbound communications to and from the internet to the satellite hub via the interconnect between the public internet service provider and the client system fails, thereby providing a back-up route to the client system; and
wherein the internet service provider is arranged to receive new communications for the client system from internet users in said internet who have not received a communication from the client system via the back-up route and who do not have visibility of the back-up route and reroute the new communications via the dedicated point-to-point interconnect, such that the back-up route is transparent to said internet users in event of said failure.

13. The public internet service provider according to claim 12, wherein the interconnect is one of: a virtual interconnect between the public internet service provider and the satellite hub over the internet; and a physical interconnect between the satellite hub and the public internet service provider.

14. The public internet service provider according to claim 12, wherein the interconnect is provided by one of: tunnelling over the internet; VPN (virtual private network) tunnelling over the internet; controlled routing over the internet; a physical cross connect; a common internet exchange; a carrier neutral co-location; and a leased line.

15. The public internet service provider according to claim 12, wherein the public internet service provider is adapted to use a private routing protocol for routing communications via the interconnect.

16. The public internet service provider according to claim 15, wherein the public internet service provider is configured to translate between a public dynamic routing protocol used by routers in the internet and the private routing protocol.

17. The public internet service provider according to claim 15, wherein the private routing protocol is one of dynamic and static.

18. The public internet service provider according to claim 17, wherein the private routing protocol is an interior gateway protocol (igp).

19. A satellite hub comprising:
a satellite link for connecting the satellite hub to a client system
and a dedicated point-to-point interconnect for connecting the satellite hub to a public internet service provider
wherein the satellite hub is configured to communicate with the public internet service provider whereby when the public internet service provider detects a failure of a primary connection between the client system and an internet, outbound and inbound communications to and from the internet are re-routed through the satellite hub to the client system via the dedicated point-to-point interconnect, thereby providing a back-up route to the client system; and wherein the internet service provider is arranged to receive new communications for the client system from internet users in said internet who have not received a communication from the client system via the back-up route and who do not have visibility of the back-up route and reroute the new communications via the dedicated point-to-point interconnect, such that the back-up route is transparent to said internet users in event of said failure.

20. A satellite hub according to claim 19, wherein the interconnect is one of: a virtual interconnect between the satellite hub and the public internet service provider over the internet; and a physical interconnect between the satellite hub and the public internet service provider.

21. A satellite hub according to claim 19, wherein the interconnect is provided by one of: tunnelling over the internet; vpn (virtual private network) tunnelling over the internet; controlled routing over the internet; a physical cross connect; a common internet exchange; a carrier neutral co-location; and a leased line.

22. A satellite hub according to claim 19, wherein the satellite hub is adapted to use a private routing protocol for routing communications via the interconnect.

23. A satellite hub according to claim 22, wherein the private routing protocol is one of dynamic and static.

24. A satellite hub according to claim 23, wherein the private routing protocol is an interior gateway protocol (igp).

25. A communications network comprising:
   a client system comprising a satellite transceiver;
   a public internet service provider supporting a public dynamic routing protocol;
   an internet comprising a plurality of routers supporting the public dynamic routing protocol;
   a satellite hub comprising a satellite transceiver; and
   a satellite, wherein the client system is connected to the public internet service provider by a first link,
   wherein the public internet service provider is connected to the internet by a second link, and the satellite hub and the client system are connected via the satellite and the satellite transceivers, wherein the public internet service provider and the satellite hub are connected by a dedicated point-to-point interconnect, and
   wherein the public internet service provider is configured to detect failure of the first link between the public internet service provider and the client system, and re-route outbound and inbound communications to and from the internet to the satellite hub via the interconnect between the public internet service provider and the satellite hub in the event that the first link between the public internet service provider and the client system fails, thereby providing a back-up route to the client system; and
   wherein the internet service provider is arranged to receive new communications for the client system from internet users in said internet who have not received a communication from the client system via the back-up route and who do not have visibility of the back-up route and reroute the new communications via the dedicated point-to-point interconnect, such that the back-up route is transparent to said internet users in event of said failure.

26. A method for providing connectivity between a client system and an internet, the method comprising:
   providing a public internet service provider and a satellite hub with a dedicated point-to-point interconnect therebetween;
   routing communications from the internet to the client device via a first link in normal operation; and
   re-routing communications from the internet via the dedicated point-to-point interconnect when the first link fails,
   wherein the public internet service provider detects failure of the first link between the public internet service provider and the client system and re-routes outbound and inbound communications to and from the internet to the satellite hub via the dedicated point-to-point interconnect between the public internet service provider and the satellite hub when failure of the first link is detected, thereby providing a back-up route to the client system; and
   wherein the internet service provider is arranged to receive new communications for the client system from internet users in said internet who have not received a communication from the client system via the back-up route and who do not have visibility of the back-up route and reroute the new communications via the dedicated point-to-point interconnect, such that the back-up route is transparent to said internet users in event of said failure.

27. A communications system comprising:
   a private network comprising at least one client system and a headquarters;
   a public internet service provider outside of said private network; and
   a satellite hub; and
   wherein the public internet service provider is connectable by a first link to the private network, and is connectable to the internet by a second link;
   wherein the satellite hub is connectable to the private network via a satellite link;
   wherein the public internet service provider and the satellite hub are connected by a dedicated point-to-point interconnect; and
   wherein the public internet service provider comprises a detector configured to detect failure of the first link between the public internet service provider and the private network, and a router configured to re-route outbound and inbound communications to and from the internet to the satellite hub via the interconnect between the public internet service provider and the satellite hub in the event that the first link between the public internet service provider and the private network fails, thereby providing a back-up route to the client system; and
   wherein the internet service provider is arranged to receive new communications for the client system from internet users in said internet who have not received a communication from the client system via the back-up route and who do not have visibility of the back-up route and reroute the new communications via the dedicated point-to-point interconnect, such that the back-up route is transparent to said internet users in event of said failure.

* * * * *